United States Patent
Jalali et al.

(10) Patent No.: US 10,635,205 B1
(45) Date of Patent: Apr. 28, 2020

(54) FLEXIBLE MICROSTRUCTURED AND TEXTURED METAMATERIALS

(71) Applicant: Micromotion Systems LLC, Sunnyvale, CA (US)

(72) Inventors: Mir Abbas Jalali, Palo Alto, CA (US); S Abbas Hosseini, Los Altos, CA (US); Amir Tork, Quebec (CA)

(73) Assignee: CIT ROGENE, INC, San Jose, CA (US)

( * ) Notice: Subject to any disclaimer, the term of this patent is extended or adjusted under 35 U.S.C. 154(b) by 20 days.

(21) Appl. No.: 15/914,978

(22) Filed: Mar. 7, 2018

Related U.S. Application Data

(60) Provisional application No. 62/468,813, filed on Mar. 8, 2017.

(51) Int. Cl.
*G06F 3/041* (2006.01)
*C03B 33/08* (2006.01)

(52) U.S. Cl.
CPC ............ *G06F 3/041* (2013.01); *C03B 33/082* (2013.01)

(58) Field of Classification Search
CPC .............................. G06F 3/041; C03B 33/082
See application file for complete search history.

(56) References Cited

U.S. PATENT DOCUMENTS

| | | | |
|---|---|---|---|
| 2014/0356819 A1* | 12/2014 | Rodriguez Regalado | A61F 9/08 434/114 |
| 2016/0041663 A1* | 2/2016 | Chen | G06F 3/0412 345/174 |
| 2017/0197823 A1* | 7/2017 | Wachtler | H01L 23/3135 |
| 2018/0081464 A1* | 3/2018 | Sunada | G06F 3/044 |
| 2018/0089984 A1* | 3/2018 | Subramanian | H05K 1/028 |

\* cited by examiner

*Primary Examiner* — Premal R Patel
(74) *Attorney, Agent, or Firm* — Frijouf, Rust & Pyle P.A.

(57) ABSTRACT

This invention disclosure addresses the fabrication of deformable microstructured and textured sheets of transparent materials such as glass. The flexible structures have islands of arbitrary geometrical shapes interconnected by springs. Structuring is performed using ultrafast laser pulses and specially designed post-processing. The fabrication process does not create any cracks perpendicular to the cut lines, and therefore, resulting deformable structures are capable of sustaining static and cyclic in-plane tensile and compressive forces, bending moments and twisting torques. Flexible structures of this invention, fabricated using thin sheets of glass, can deform to complex surfaces through stretching, compression and folding in all directions.

15 Claims, 9 Drawing Sheets

FLEXIBLE MICROSTRUCTURED AND TEXTURED METAMATERIALS

CROSS-REFERENCE TO RELATED APPLICATIONS

This application claims benefit of U.S. Patent Provisional application No. 62/468,813 filed 8 Mar. 2017. All subject matter set forth in provisional application No. 62/468,813 filed 8 Mar. 2017 is hereby incorporated by reference into the present application as if fully set forth herein.

BACKGROUND OF THE INVENTION

Field of the Invention

This invention relates to electronics and more particularly to a flexible microstructured and textured metamaterial.

Description of the Related Art

Electronic circuits and displays have usually planar structures made by lithography techniques that include selective etching and lift-off of one or several deposited layers on a planar substrate. The emergence of new technologies in biosciences, medical devices, environmental monitoring, displays, human-machine interactions, energy generation, conversion and storage, and wireless communications has generated an unprecedented demand on flexible substrates. Applications of flexible substrates and structures are not limited to electronic devices. Microfluidic chips used for point-of-care diagnostics or the ones used on wearable devices also require flexible substrates. Light emitting diodes, photodetectors, transistors and micro-scale coils are among notable components that have been successfully printed on deformable interconnected islands, all embedded in soft elastomeric membranes or polymers.

Current method of fabricating flexible electronics includes the following steps: depositing thin epitaxial semiconductor layers grown on GaAs wafers and vertically etching them. Releasing through selective elimination of an underlying layer of AlAs followed by transfer printing, complete the integration of required patterns on substrates. The method practiced so far uses two steps: printing the semiconductor materials on a temporary substrate (glass plate coated with a trilayer of epoxy-polyimide-polymethylmethacrylate (PMMA) to form contacts, interconnections and bridges. By dissolving the polyimide-polymethylmethacrylate (PMMA), interconnected collections of islands, with each island hosting a device is extracted. The second step integrates the interconnected (bridged) structure in elastomeric sheets such as polydimethylsiloxane (PDMS). This secondary flexible substrate carries a significant portion of structural loads, especially tensile stresses, and its strong bonding to the semiconductor material (at the locations of the devices and bridges) is necessary. An essential step of the procedure is thin-film metallization for interconnections. The procedure outlined above, however, has been practiced in academic laboratories is expensive and limited to non-transparent semi-conductor microstructures, textures and patterns. The present invention solves the fabrication problem of fully transparent, glass-based deformable structures and textures with islands and flexible (spring-like) interconnections. Deformable glass structures, textures and microstructures proposed in this disclosure are stretchable, bendable and twistable in three dimensions.

Therefore, it is an object of the present invention to provide an improved flexible substrate suitable for receiving electrical and electronic components.

Another object of the present invention is to provide a flexible substrate that functions as a three dimensional touchscreen.

Another object of the present invention is to provide a flexible substrate that functions as a braille touchscreen.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of sumnmarizing the invention, the invention relates to a flexible substrate, comprising an array of substantially rigid islands. A plurality of resilient connectors interconnect the array of substantially rigid islands. The array of substantially rigid islands and the plurality of resilient connectors are formed from a single sheet of material to provide the flexible substrate.

In a more specific example, each of the substantially rigid islands is adapted to receive an electrical component, such as an integrated circuit, a sensor or a power supply. Each of the plurality of resilient connectors includes a curved connector. Preferably, each of the plurality of resilient connectors comprises at least a one hundred and eighty degree curve. The plurality of resilient connectors are sufficiently thin to enable the plurality of resilient connectors to act as springs. The resilient connectors may be adapted to receive an electrical connector.

In another specific example, the single sheet of material is a sheet of glass. The flexible substrate may be encapsulated in a flexible polymeric material. In one example, the array of substantially rigid islands includes sensors to form a three dimensional touch screen upon flexing of the flexible substrate. In the alternative, a set of the array of the islands form a cell of a Braille notation. A plurality of magnets cooperate with the set of the array of the islands to raise and lower selective rigid islands to form raised dots of the Braille notation.

The invention also resides in the method of transforming a substantially rigid member into a flexible substrate. The process comprises cutting the regions from the substantially rigid member in a pattern to define an array of islands interconnected by a plurality of connectors. The material external the array of islands and external the plurality of connectors is removed for enabling the plurality of connectors to function as resilient connectors to create the flexible substrate. Preferably, the step of cutting the regions from the substantially rigid member in a pattern includes laser cutting a glass member.

Present invention solves the problem of fabricating flexible structures and microstructures of transparent materials, including glass. Using laser scribing and a specially designed post-processing method, micro-scale patterns are carved (as through cuts) on glass sheets creating a custom-designed deformable pattern. The structured glass has new mechanical properties under tensile forces, bending moments and twisting torques. It can therefore be considered as a planar metamaterial with deformability in three dimensions. The process of fabricating flexible microstructures covers a wide range of thicknesses for glass sheets and does not create any residual cracks perpendicular to the cut lines scribed by laser. Consequently, the resulting flexible structure is durable under a predictable range of static and dynamic loadings. Flexible glass structures and microstructures made by the process of this invention are stretchable, bendable, and twistable.

There are a wide range of applications for the technology disclosed in this invention, including flexible organic LED (OLED) display technology where OLEDs are printed on the structured glass substrate. One application is to print optical (photo) or micro-electro-mechanical sensors on flexible glass structures and make transparent, deformable detectors, wearable transparent sensors that completely follow the profiles of body parts such as fingers (in making flexible fingerprint scanners), and wrist and elbow (for human-machine interactions and virtual reality devices). The present invention provides a versatile platform for adaptive optics technology: flexible glass structures coated by reflective materials and actuated by electrostatic or electromagnetic forces can correct disturbed wavefronts more efficient than deforming mirrors by piezo-electric or other actuators. In adaptive optics, flexible glass structures of this invention can support large deflections and correct for complex wavefronts over a wide actuation frequency range.

Flexible structures made of ultrathin glass are also beneficial in high power density batteries that are molded into custom-designed shapes. One of the most important applications of flexible transparent structures is in nonvisual interaction with touch-screens and display-centric devices. Although new touchscreen technologies are continuously developed, they do not necessarily lead to full user satisfaction because they only give real-time visual feedback, requiring significant cognitive efforts. Microstructured flexible displays with location-specific, real-time textural feedback can significantly lower cognitive efforts while maintaining the classical visual function of the display. In other words, flexible microstructured touchscreens can provide a haptic feedback without obscuring the display.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
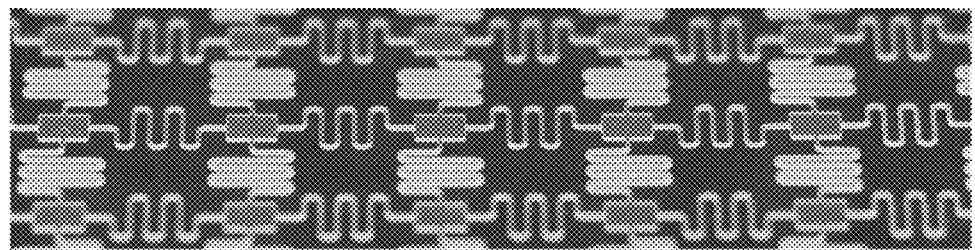
FIG. 1 illustrates an experimental flexible glass microstructure (glass metamaterial) consisting of spring-connected square islands. All islands and their connecting springs are a single object cut from a glass sheet.

FIG. 1 shows a thin glass sheet on which microstructures composed of islands are interconnected by springs. The microstructure can be stretched in the plane of the glass sheet and be bent under lateral point or distributed loads. Thin and ultrathin glass sheets can be scribed by ultrafast laser pulses. The accuracy of the process is better than one micron. Although the present inventions is being explained with reference to a glass, it should be understood that the flexible substrate may be formed of other materials compatible with electrical and electronic components.

Figure 2:
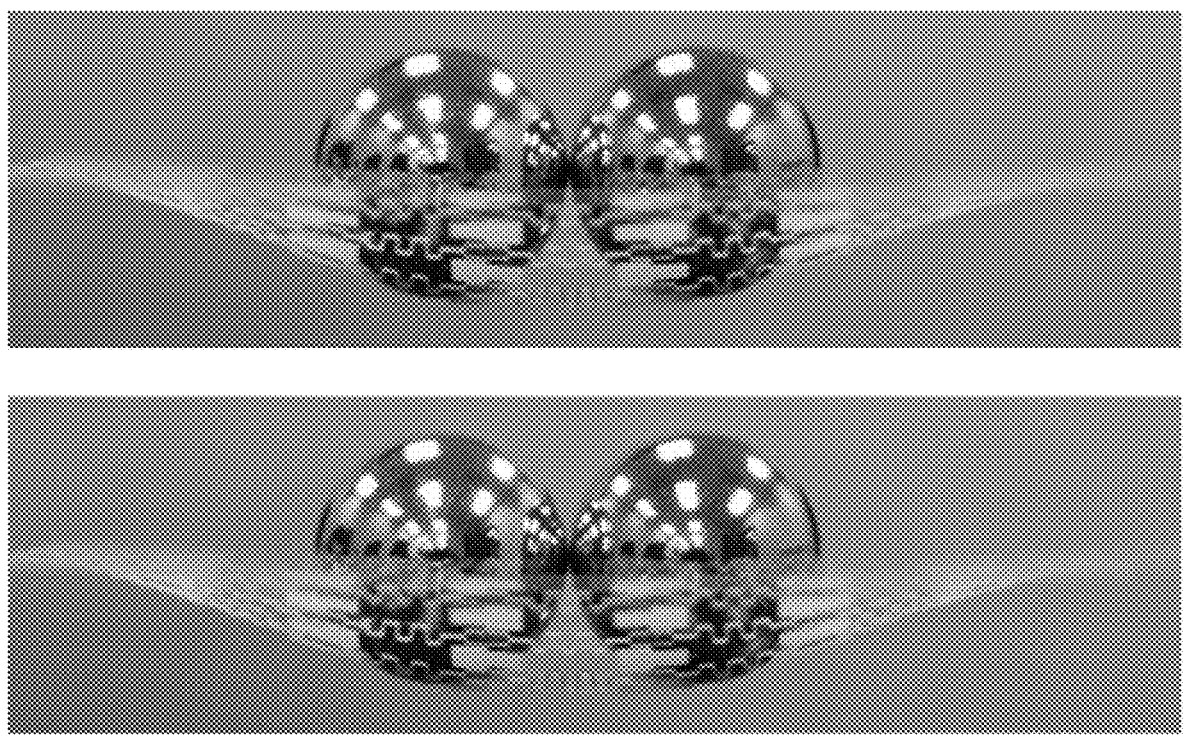
FIG. 2 shows the loaded flexible glass structure of FIG. 1 and its large-scale deformations. This experiment clearly shows how the structure is stretched and folded by applying a lateral force (here the weight of the spherical balls).

FIG. 2 shows how the flexible glass structure has been deformed when loaded by one or two spherical ball(s). Springs have been stretched to form an extremely deformable web-like folded surface.

Figure 3:
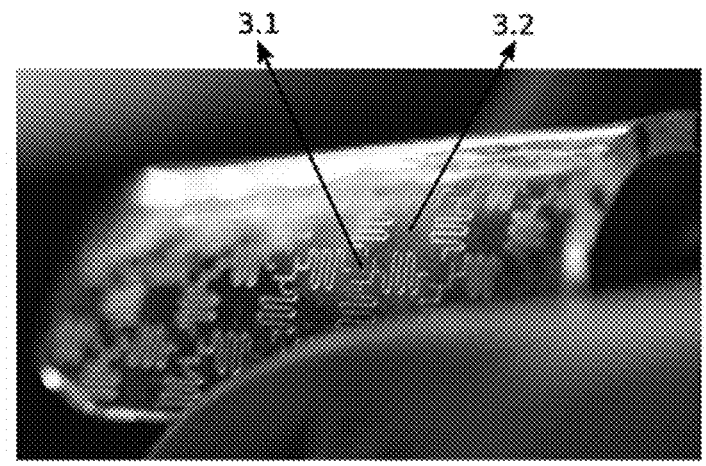
FIG. 3 illustrates an experimental sample where a flexible glass structure 3.1 (spring-connected square islands) has been embedded in PDMS component 3.2.

FIG. 3 demonstrates how a layer of flexible glass microstructure 3.1 and its surrounding PDMS layer 3.2 are folded without damaging the structured glass layer. In some applications it is desired to increase the size of islands and reduce the space occupied by interconnecting springs.

Embedding the flexible glass microstructure of FIG. 1 in a polydimethylsiloxane (PDMS) film gives an optically transparent deformable metamaterial that can resist larger normal stresses than the original glass microstructure. Most of the bending and in-plane tensile stresses are supported by the polydimethylsiloxane (PDMS) component while the glass microstructure follows the strains of the polydimethylsiloxane (PDMS) layer and performs the main actuation and sensory functions of the metamaterial.

Figure 4:
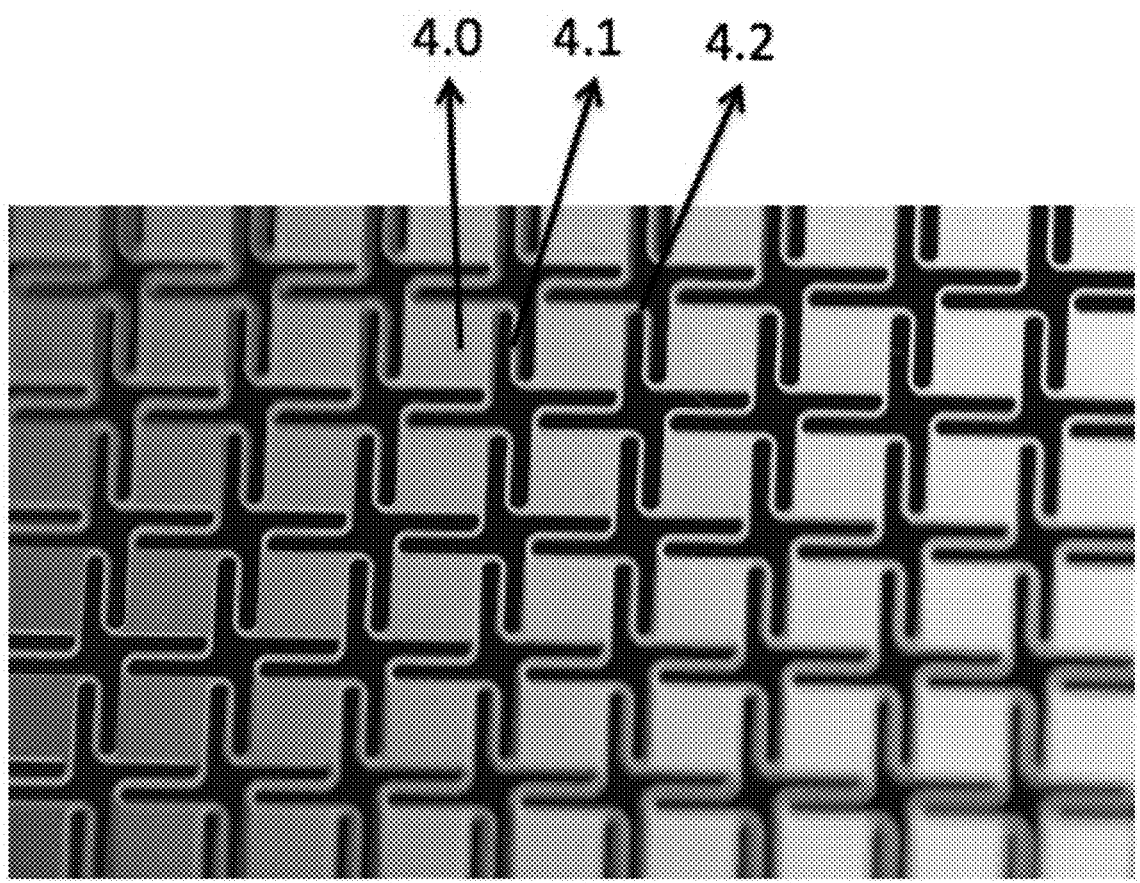
FIG. 4 shows an experimental flexible texture of square-shaped islands 4.1 interconnected by beam springs 4.2. In order to reduce stress concentration, beam springs 4.2 are connected to the islands by half-circle bases 4.3. The difference between this sample and the one demonstrated in FIG. 1 is the more compact tiling of spring-connected islands: fine texture.

FIG. 4 shows such an example where each island 4.1 is connected to its neighboring islands through single beam springs 4.2. Each spring 4.2 reaches to an island through a specially designed curve 4.3 that minimizes stress concentrations upon loading and increases the flexibility of the entire structure. The thickness of the main glass sheet can range from tens of microns to a few millimeters. The width of each beam spring 42 depends on the kind of connections it makes between islands and the overall required deflection and deformability. Widths as small as 30 microns or less can be reached using ultrafast laser pulses and subsequent post-processing.

Figure 5:
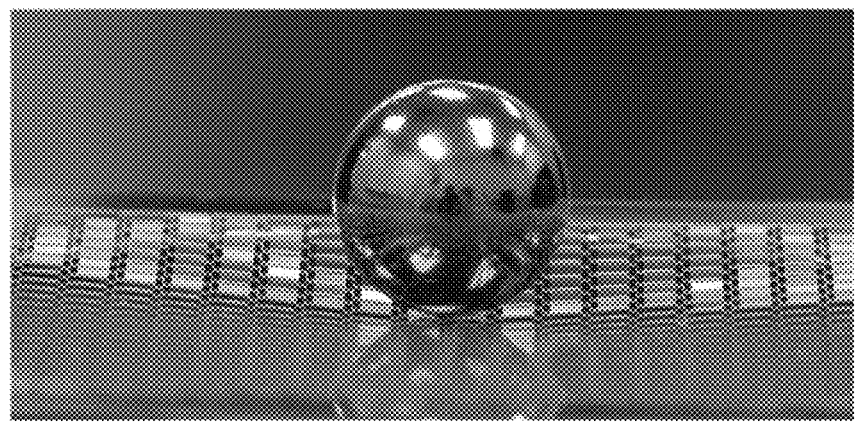
FIG. 5 shows the loaded flexible microstructure of FIG. 4. It is seen how the structure has been deformed. The reflection of light shows individual islands have been translated and rotated due to existing flexibility.

FIG. 5 shows how compact arrays of islands deform by putting one or two spherical balls on them. Reflections of the environmental light show that each island has gone through three dimensional translations and full three dimensional reorientations. This feature makes the structure an ideal platform for optical sensors. The deformation of the array of islands by the spherical balls may be achieved by a finger of an operator. The deformation of the array of islands by a finger of an operator will result in sensors mounted on the array of islands to function as a haptic touch screen.

On the flexible glass structures and metamaterials disclosed in this invention, thin films of various materials and electrodes can be deposited, making the flexible glass structure electronically and optically functional. Different deposition techniques such as sputter vapor deposition, electron beam deposition, chemical or physical vapor deposition are possible. The transparent thin film electrode can be selected from an n-type or p-type material. Examples of n-type materials are ITO, ZnO, indium oxide ($In_2O_3$), Tin oxide ($SnO_2$), Cadmium oxide (CdO) and any combination thereof. Examples of possible p-type materials are $Cu_2O$, $CuAlO_2$ and any combination thereof. Non transparent thin film electrodes can also be selected from the sputter metals such as silver (Ag), Gold (Au), Nickel (Ni), Nichrome (Ni/Cr), Copper (Cu), Platinum (Pt), Molybdenum (Mo), Titanium (Ti), and any alloy and combination thereof. For the protection of the thin-film electrodes mentioned above, a passive layer can be deposited on the surface of the entire glass substrate and its thin film coatings or electrodes. Accordingly, each of the islands may receive an electrical component, a electronic component such as an integrated circuit, a sensor, a power supply or the like.

Figure 6:
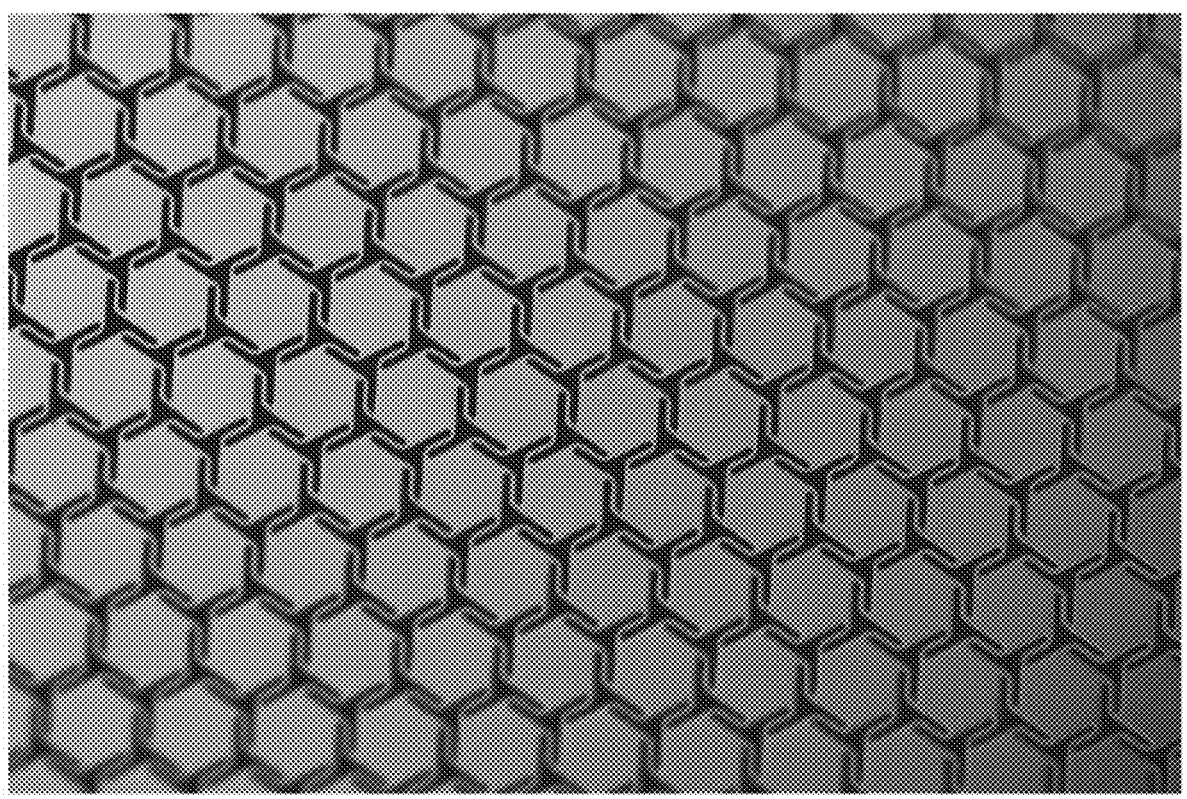
FIG. 6 presents a schematic of a hexagonal flexible structure that can be made as a single object using thin glass sheets.

FIG. 6 presents a schematic of a hexagonal flexible structure that can be made as a single object using thin glass sheets. The geometry of flexible glass structures is not limited to a Cartesian array of spring-connected islands. The invention presented in this disclosure covers all possible geometries with features as small as 30 microns or less. Arrays and tiles of hexagonal interconnected islands (honeycomb) as in segmented-mirror devices and more complex shapes all are possible to make. The textures and microstructures disclosed in this invention are created by through cuts of the original glass sheet.

Figure 7:
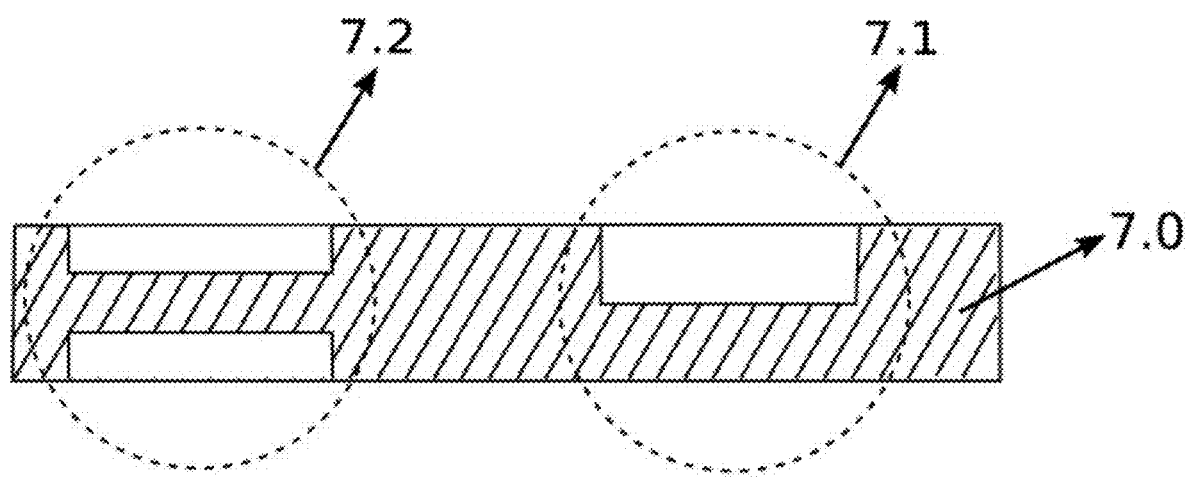
FIG. 7 shows side views of single- (7.1) and double-sided (7.2) blind features carved on a glass sheet 7.0.

FIG. 7 shows the side view of a glass sheet 7.0 with a single-sided carved feature 7.1, and a double-sided carved feature 7.2. The fabrication technique of making these microstructures and textures can be utilized to carve out single-sided blind features on a glass sheet (the microstructures of FIG. 1 and FIG. 4 have been created by through cuts). These blind microstructures, features and textures can also be double-sided. Although the resulting structure with single-sided or double-sided blind carvings is not stretchable, it is still bendable and twistable.

Figure 8:
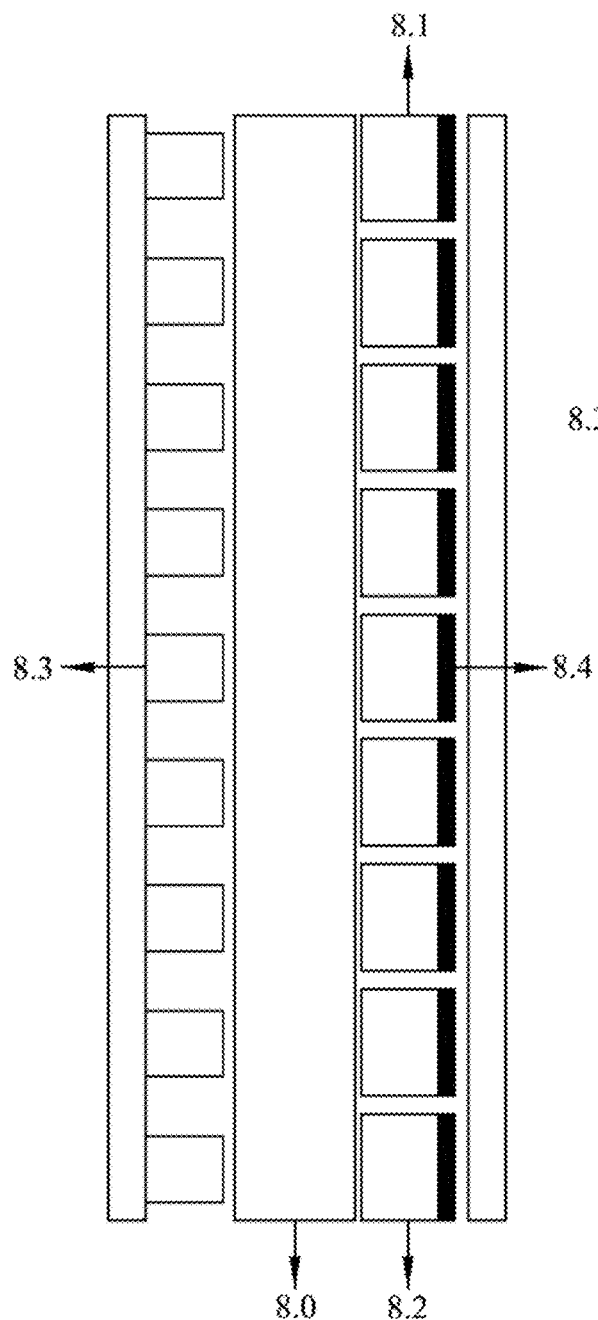
FIG. 8 presents schematic side view of haptic touch screen suitable for Braille notation.

FIG. 8 presents the structure of haptic touch screen using flexible metamaterials. In normal touch screens, display can be LCD or OLED with a printed solid glass on top as touch sensor. They work based on capacitance or resistance changes location detection caused by touch. There are efforts to fabricate touch screen by soft materials but printing transparent metal i.e. ITO (Indium Thin Oxide) was not possible on such materials. In this invention structured glass with touch screen circuit 8.1 is installed on the display 8.0. The cut lines on the structured glass 8.1 are designed as such they overlap between the pixels of display, so image still have high contrast. A layer of transparent magnet 8.2 is coated on the structured glass 8.1. To avoid any dust or dirt enter to the cut regions a thin layer of soft transparent sheet 8.4 is covered the structured glass. An actuator 8.3 is located behind the display and it can push the touch surface back and forth.

For example, a driver is driving and touches the display equipped with haptic touch screen. Without looking to the screen it is possible to navigate on the display. First tough senses the location of touch and controller orders the actuator to act. Imagine there is a volume to turn, user can feel the location of volume if touches the correct location. In addition, the haptic touch screen of FIG. 8 is suitable for Braille notation.

Figure 8A:
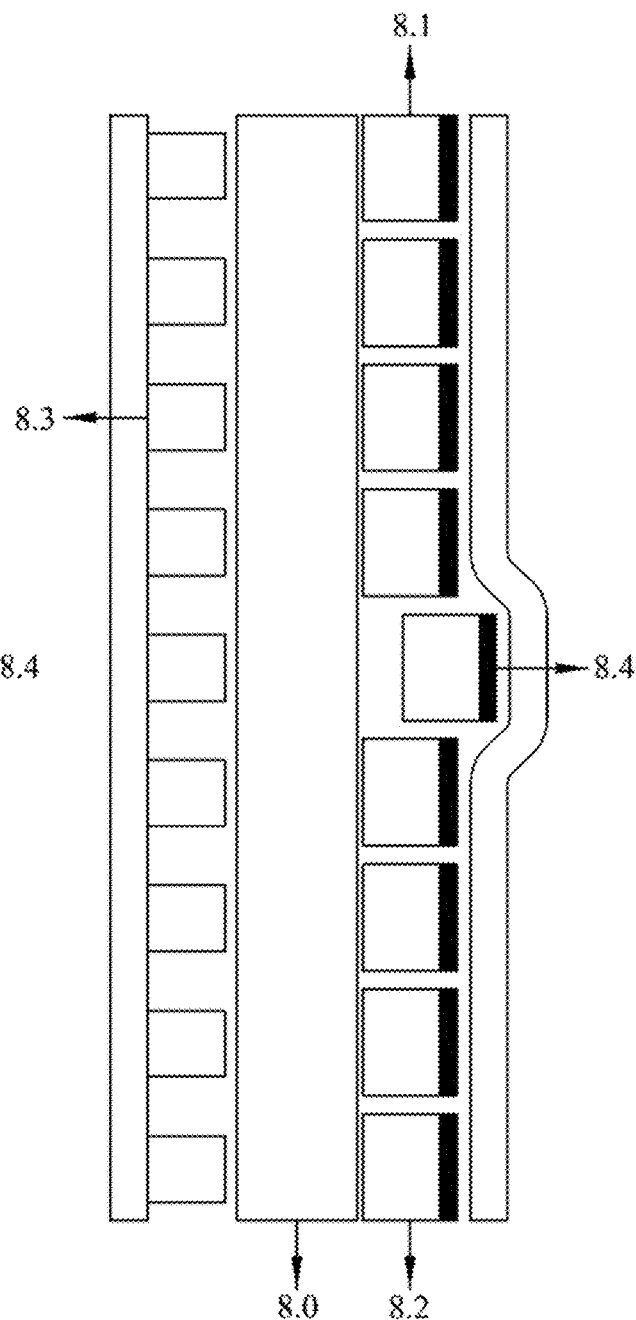
FIG. 8A is a view similar to FIG. 8 illustrating the activation of a raised dot of the Braille notation.

FIG. 8A is a view similar to FIG. 8 illustrating the activation of a raised dot of the Braille notation. The array of the islands may be disposed as a Braille cell. The actuation of one or more of the actuators 8.3 will provide Braille communication.

Figure 9:
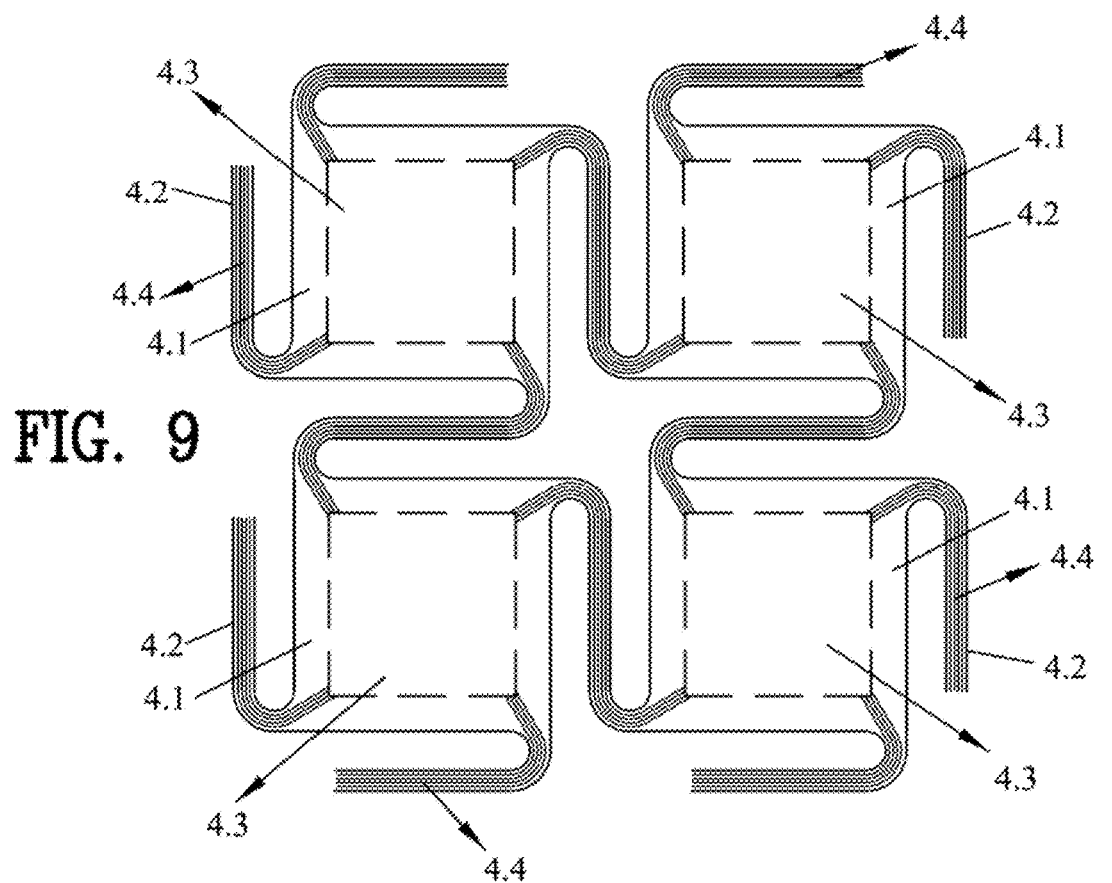
FIG. 9 is an enlarged view of a portion of FIG. 4 illustrating the connection of electrical and electronic components.

FIG. 9 is an enlarged view of a portion of FIG. 4 illustrating the connection of electrical and electronic components. The electrical and electronic components 4.3 located on the islands 4.1 are connected by connectors 4.4 located on the resilient connectors 4.2.

Figure 10:
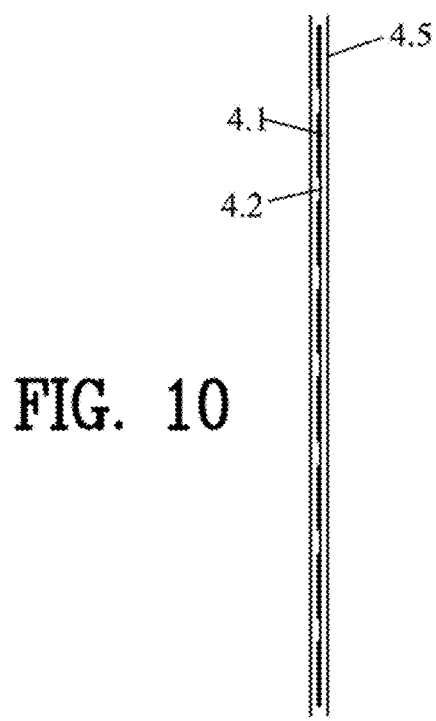
FIG. 10 is a side sectional view of a touch screen in an unattended condition.

FIG. 10 is a side sectional view of a touch screen in an unattended condition. Sensors 4.3 are located on the islands 4.1 as one of the electrical and electronic components 4.3 shown in FIG. 9. The islands 4.1 and the connectors 4.4 are encapsulated in a polymeric material 4.5.

Figure 10A:
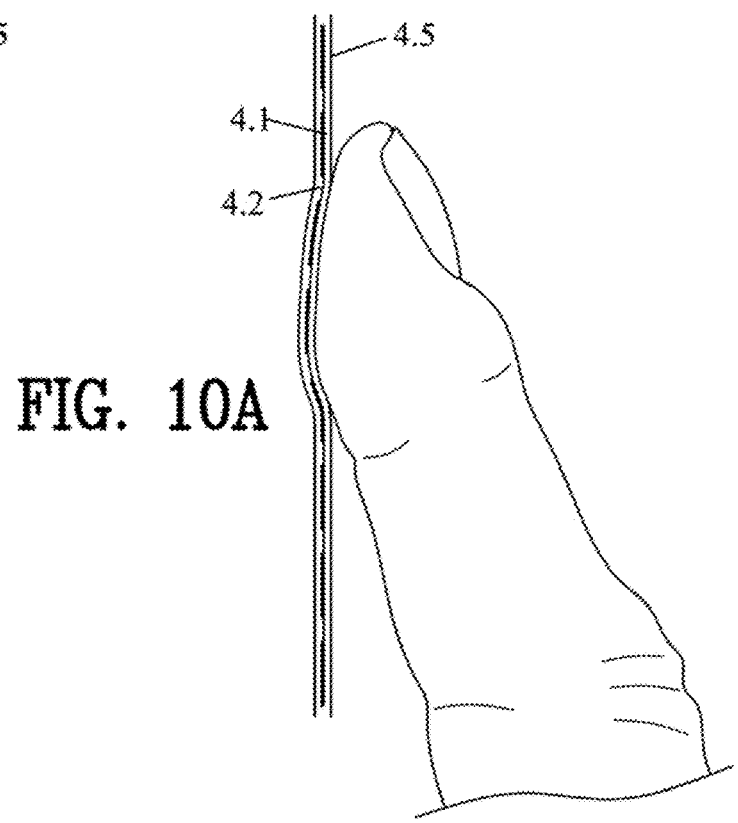
FIG. 10A is a view similar to FIG. 10 illustrating the activation of touch screen by a finger of an operator.

FIG. 10A is a view similar to FIG. 10 illustrating the activation of touch screen 10.1 by a finger of an operator. The resilient touch screen 10.1 provides a three dimensional touch sensation to the operator and a three dimensional input to the touch screen 10.1.

This invention can be very useful in automotive safety, interactive sensing for the games, or even can make vision umpired people to sense the writing as digital Braille font. A set of islands 8.1 form a cell of a Braille notation. A selective one of the plurality of magnets 8.3 raises selective islands to form raised dots of the Braille notation.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:
1. A flexible substrate, comprising:
   a sheet of a substantially rigid material;
   an array of substantially rigid islands interconnected by a plurality of connectors defined by cut out and removed regions within said sheet of said substantially rigid material;

said plurality of connectors being dimensioned by said cut out and removed regions to give resiliency to said plurality of connectors; and said array of substantially rigid islands and said plurality of resilient connectors being formed from said sheet of substantially rigid material to provide the flexible substrate.

2. The flexible substrate as set forth in claim 1, wherein each of said substantially rigid islands is adapted to receive an electrical component.

3. The flexible substrate as set forth in claim 1, wherein each of said plurality of resilient connectors includes a curved connector.

4. The flexible substrate as set forth in claim 1, wherein each of said plurality of resilient connectors comprise at least a one hundred and eighty degree curve.

5. The flexible substrate as set forth in claim 1, wherein each of said plurality of resilient connectors are sufficiently thin to enable said plurality of resilient connectors to act as springs.

6. The flexible substrate as set forth in claim 1, wherein each of said substantially resilient connectors is adapted to receive an electrical connector.

7. The flexible substrate as set forth in claim 1, wherein said single sheet of material is a brittle material selected from the group consisting of a sheet of glass.

8. The flexible substrate as set forth in claim 1, including a polymeric encapsulation surrounding said flexible substrate.

9. The flexible substrate as set forth in claim 1, wherein said array of substantially rigid islands includes sensors; and said array of substantially rigid islands forming a three dimensional touch screen upon flexing of said flexible substrate.

10. The flexible substrate as set forth in claim 1, wherein a set of said array of said islands form a cell of a Braille notation; and a plurality of magnets cooperating with said set of said array of said islands to raise and lower selective rigid islands to form raised dots of the Braille notation.

11. A flexible electrical device, comprising:

a sheet of a substantially rigid material;

an array of substantially rigid islands interconnected by a plurality of connectors defined by cut out and removed regions within said sheet of said substantially rigid material;

said array of substantially rigid islands receiving an electrical component;

said plurality of connectors being dimensioned by said cut out and removed regions to give resiliency to said plurality of connectors;

a plurality of resilient electrical connectors located on said plurality of connectors and interconnecting said electrical component;

said array of substantially rigid islands and said plurality of resilient connectors affording flexibility to said entire sheet of said substantially rigid material to provide the flexible substrate.

12. The flexible substrate as set forth in claim 11, wherein said electrical component are integrated circuits.

13. The flexible substrate as set forth in claim 11, wherein said electrical component is a sensor.

14. The flexible substrate as set forth in claim 11, wherein said electrical component is a power supply.

15. A flexible electrical device, comprising:

a sheet of glass;

an array of substantially rigid glass islands interconnected by a plurality of glass connectors defined by cut out and removed regions within said sheet of glass;

said array of substantially rigid glass islands receiving an electrical component;

said plurality of glass connectors being dimensioned by said cut out and removed regions of said glass to give resiliency to said plurality of glass connectors;

a plurality of resilient electrical connectors located on said plurality of glass connectors and interconnecting said electrical component;

said array of substantially rigid glass islands and said plurality of resilient glass connectors creating flexibility to said entire sheet of said glass to provide the flexible substrate.

* * * * *